United States Patent
Wu et al.

(10) Patent No.: US 12,555,178 B2
(45) Date of Patent: Feb. 17, 2026

(54) GRAPHICS SYSTEM

(71) Applicant: MEDIATEK INC., Hsinchu (TW)

(72) Inventors: Yu-Hua Wu, Hsinchu (TW);
Yong-Guan Liao, Hsinchu (TW);
Kuan-Yu Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 150 days.

(21) Appl. No.: 18/637,735

(22) Filed: Apr. 17, 2024

(65) Prior Publication Data

US 2024/0354887 A1  Oct. 24, 2024

Related U.S. Application Data

(60) Provisional application No. 63/496,702, filed on Apr. 18, 2023.

(51) Int. Cl.
*G09G 5/14* (2006.01)
*G06T 1/20* (2006.01)
*G06T 3/40* (2024.01)
*G09G 5/36* (2006.01)
*G09G 5/39* (2006.01)
*H04N 5/45* (2011.01)
*H04N 7/01* (2006.01)
(Continued)

(52) U.S. Cl.
CPC .................................... *G06T 1/20* (2013.01)

(58) Field of Classification Search
CPC .... G06T 1/20; G06T 3/40; G06T 3/14; G06T 2207/10016; G06T 2207/10021; H04N 5/45; H04N 5/2628; H04N 5/2624; H04N 5/272–278; H04N 5/923; H04N 7/012; H04N 7/0127; H04N 7/083; H04N 7/087; H04N 7/52–56; H04N 2005/9135; H04N 2005/91385; H04N 21/4316; H04N 21/4305; H04N 21/440281; H04N 21/47; G09G 5/00–026; G09G 5/14; G09G 5/18; G09G 5/346; G09G 5/37–39; G09G 5/393–399

See application file for complete search history.

(56) References Cited

U.S. PATENT DOCUMENTS 6,307,597 B1 * 10/2001 Patton ...................... H04N 5/45
                                                      348/367
6,469,746 B1 * 10/2002 Maida ................ H04N 21/4316
                                                      348/564

(Continued)

*Primary Examiner* — Wesner Sajous
(74) *Attorney, Agent, or Firm* — McClure, Qualey & Rodack, LLP

(57) ABSTRACT

A graphics system is provided. The graphics system includes a frame buffer, a timing controller, and a processing unit. The processing unit generating an output video frame based on a raw video frame. The output video frame includes the main window and a picture-in-picture window overlaid on the main window, and the picture-in-picture window is generated by zooming in a target region of the main window. The timing controller is configured to generates a first vertical synchronization signals to control the input timing for the processing unit to write the raw video frame into the frame buffer, and generate a second vertical synchronization signal to control an output timing for the processing unit to read the raw video frame from the frame buffer and generating the output video frame, such that specific timing conditions are met.

10 Claims, 8 Drawing Sheets

(51) Int. Cl.
   *H04N 21/43*       (2011.01)
   *H04N 21/44*       (2011.01)

(56) References Cited

U.S. PATENT DOCUMENTS

2002/0154658 A1* 10/2002 Song .................. H04N 21/4316
                                                370/537
2006/0092163 A1*  5/2006 Kuo ......................... G09G 5/14
                                                345/522

\* cited by examiner

GRAPHICS SYSTEM

CROSS REFERENCE TO RELATED APPLICATIONS

This application claims the benefit of U.S. Provisional Application No. 63/496,702, filed Apr. 18, 2023, the entirety of which is incorporated by reference herein.

BACKGROUND OF THE INVENTION

Field of the Invention

The present disclosure relates generally to computer graphics and timing control, and it relates in particular to a graphics system that instantly generates a zoomed-in picture-in-picture (PIP) window.

Description of the Related Art

Zoomed-in picture-in-picture, or zoomed-in PIP, refers to a technique where a specific region of interest within a larger main window is magnified and displayed as a smaller inset window overlaid on the main window. This inset window provides viewers with a closer look at the target region, enhancing their ability to observe fine details or specific points of interest.

FIG. 1 illustrates an example of a video frame 10 derived through the zoomed-in PIP technique. As shown in FIG. 1, the video frame 10 contains a main window M and a PIP window overlaid on the main window M, where the PIP window is the outcome of zooming in on a target region TR of the main window M. The target region TR can be a fixed location, user-specified, or determined by specific algorithms such as region of interest (ROI) detection algorithms.

The zoomed-in PIP finds applications across various fields. In surveillance systems, the PIP window can be used to magnify and focus on specific regions of interest within a larger surveillance footage, enabling security personnel to closely monitor critical regions for any suspicious activities. During video conferences or remote learning sessions, the PIP window can be used to highlight particular sections of presentations or demonstrations, allowing participants to better comprehend complex concepts or follow along with the speaker's gestures. In medical imaging, the PIP window can be used to enlarge and emphasize specific regions of interest within diagnostic images, aiding healthcare professionals in diagnosing and treating medical conditions with greater precision. In television broadcasting, the PIP window can be used zoom in on important details or events within a larger scene, enhancing viewers' engagement and comprehension of news reports or live events.

In the aforementioned applications, the PIP window is typically presented in real-time. Therefore, there is a need for a graphic system that can overcome the technical challenge of instantly generating the PIP window.

BRIEF SUMMARY OF THE INVENTION

An embodiment of the present disclosure provides a graphics system. The graphics system includes a frame buffer, a timing controller, and a processing unit. The processing unit generating an output video frame based on a raw video frame. The output video frame includes the main window and a picture-in-picture window overlaid on the main window, and the picture-in-picture window is generated by zooming in a target region of the main window. The processing unit generates the output video frame by writing the raw video frame into the frame buffer sequentially line by line, and reading the raw video frame from the frame buffer sequentially line by line while zooming in a portion of the target region being read to generate a corresponding portion of the picture-in-picture window. The timing controller is configured to generates a first vertical synchronization signals to control the input timing for the processing unit to write the raw video frame into the frame buffer, and generate a second vertical synchronization signal to control an output timing for the processing unit to read the raw video frame from the frame buffer and generating the output video frame, such that a first writing point on the input timing at which the processing unit starts writing the main window into the frame buffer precedes a first reading point on the output timing at which the processing unit starts reading the main window from the frame buffer and generating the output video frame, and a second writing point on the input timing at which the processing unit starts writing the target region into the frame buffer precedes a second reading point on the output timing at which the processing unit starts reading the target region from the frame buffer and generating the picture-in-picture window.

In an embodiment, the timing controller is further configured to control the phase difference between the input timing and the output timing.

In an embodiment, the timing controller is further configured to detect the phase difference between the input timing and the output timing, and compare the phase difference to a target delay value. The timing controller is further configured to increase a vertical frequency of the output timing, in response to the phase difference exceeding the target delay value. The timing controller is further configured to decrease the vertical frequency of the output timing, in response to the phase difference not exceeding the target delay value. In a further embodiment, the timing controller is further configured to determine the target delay value based on the first line-count difference between the target region and the main window of the raw video frame, as well as the second line-count difference in number of lines between the picture-in-picture window and the main window of the output video frame.

In an embodiment, the timing controller is further configured to set a reference point of the second vertical synchronization signal to occur at a target phase difference following the corresponding reference point of the first vertical synchronization signal. In a further embodiment, the timing controller is further configured to determine the target phase difference based on a first line-count difference between the target region and the main window of the raw video frame, as well as a second line-count difference between the picture-in-picture window and the main window of the output video frame.

In an embodiment, the timing controller is further configured to accelerate the input timing such that the second writing point precedes the second reading point. In a further embodiment, the timing controller is further accelerates the input timing by increasing a vertical total time of the input timing. In a further embodiment, the timing controller accelerates the input timing by enabling a Quick Frame Transport (QFT) parameter. In another embodiment, the timing controller accelerates the input timing by editing the extended display identification data (EDID) of the display device displaying the output video frame.

The graphics system provided by the embodiments of the present disclosure overcomes the technical challenge of instantly generating the PIP window, and ensures smooth and non-stuttering presentation even when changing the position of the target region or the zoom-in scale.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

In each of the following embodiments, the same reference numbers represent identical or similar elements or components.

Ordinal terms used in the claims, such as "first," "second," "third," etc., are only for convenience of explanation, and do not imply any precedence relation between one another.

The description for the embodiments the image processing method is also applicable to the embodiments of the image processing device, and vice versa.

Figure 1:
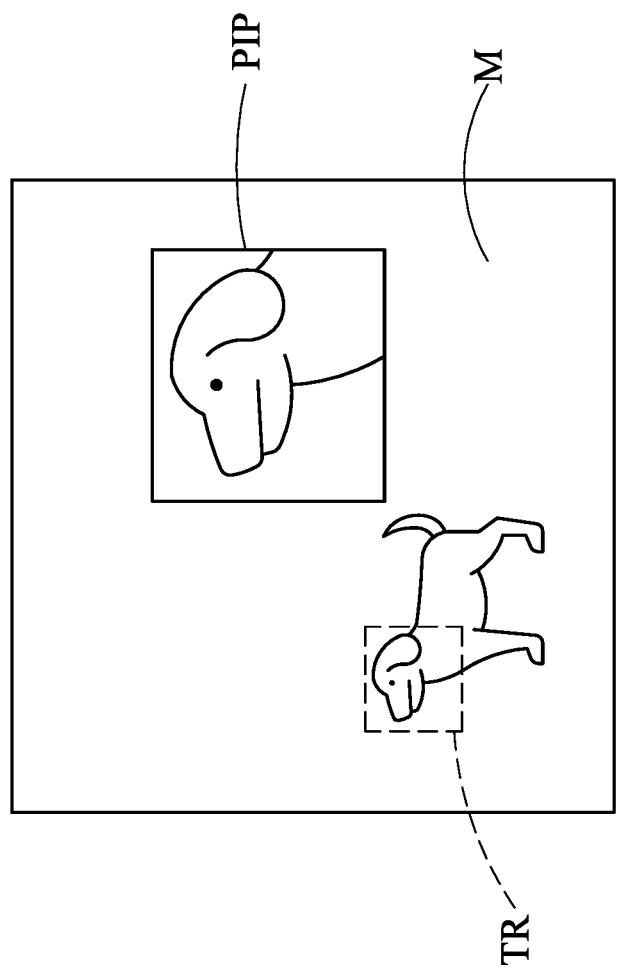
FIG. 1 illustrates an example of a video frame derived through the zoomed-in PIP technique.
Figure 2A:
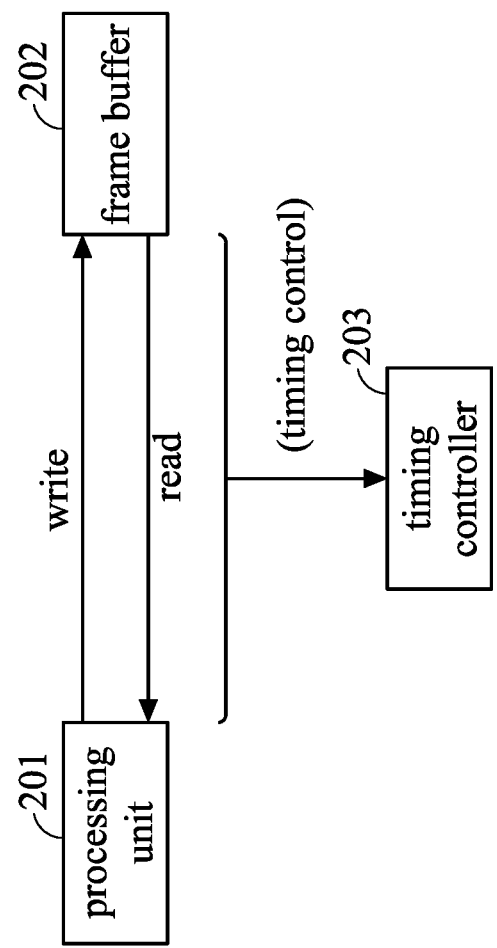
FIG. 2A is an architecture diagram illustrating the graphics system, according to an embodiment of the present disclosure.

FIG. 2A is an architecture diagram illustrating the graphics system 20, according to an embodiment of the present disclosure. The graphics system 20 may be integrated with the computer system motherboard or on a separate circuit board fixedly or removably connected with the computer system. As shown in FIG. 2, the graphics system 20 may include a processing unit 201, a frame buffer 202, and a timing controller 203.

The processing unit 201 may refer to one or more general-purpose processors (such as CPUs) or special-purpose hardware circuitries (such as GPUs) or the combination thereof, for generating an output video frame based on a raw video frame. The frame buffer 202 can be a dedicated memory area used for storing pixel data of the raw video frame, facilitating efficient rendering and display operations.

Figure 2B:
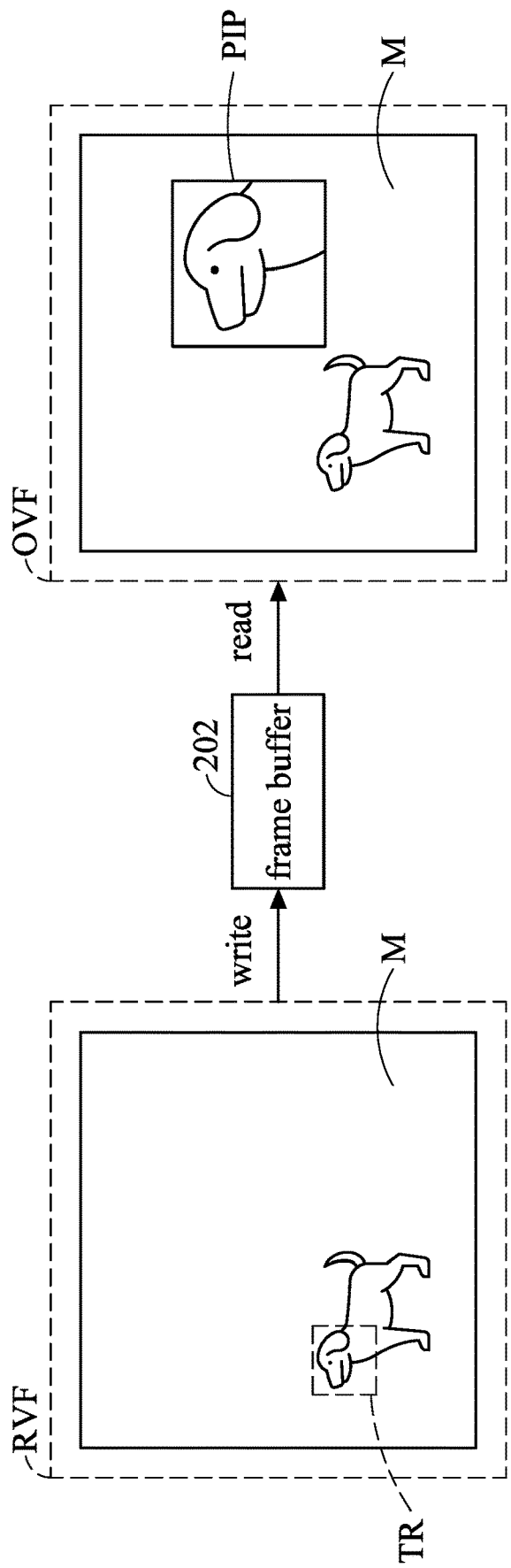
FIG. 2B is a schematic diagram illustrating the I/O operations of the processing unit to the frame buffer for generating the output video frame, according to an embodiment of the present disclosure.

FIG. 2B is a schematic diagram illustrating the I/O operations of the processing unit 201 to the frame buffer 202 for generating the output video frame OVF, according to an embodiment of the present disclosure. As shown in FIG. 2B, the processing unit 201 writes the raw video frame RVF into the frame buffer 202. The write operation is sequentially performed line by line, starting from the top line and proceeding to the bottom line of the raw video frame RVF. The raw video frame RVF includes a main window M, within which a target region TR will be zoomed in to generate the PIP window. The target region TR can be predefined, user-specified, or determined by specific algorithms such as region of interest (ROI) detection algorithms, but the present disclosure is not limited thereto. Subsequently, the processing unit 201 reads the raw video frame from the frame buffer 202. The read operation is also sequentially performed line by line. While reading, the processing unit 201 also zooms in a portion of the target region TR being read to generate a corresponding portion of the PIP window. Specifically, upon reading the first portion of the target region TR, the processing unit 201 zooms in the first portion to generate the corresponding first portion of the PIP window; upon reading the second portion of the target region TR, the processing unit 201 zooms in the second portion to generate the corresponding second portion of the PIP window, and so forth. Each portion may include a minimum number of lines required for the zoom-in operation, such as 10 lines or 20 lines, but the present disclosure is not limited thereto. As shown in FIG. 2B, the resulting output video frame OVF, which is ready to be displayed, includes the main window M and the PIP window overlaid on the main window M, where the PIP window is the outcome of zooming in on a target region TR of the main window M.

The timing controller 203 can be implemented by specialized hardware components or integrated circuits designed to generate synchronization signals to control the I/O between the processing unit 201 and the frame buffer. Specifically, the timing controller 203 is configured to generate a first vertical synchronization signal to control the input timing for the processing unit 201 to write the raw video frame RVF into the frame buffer 202, and generate a second vertical synchronization signal to control the output timing for the processing unit to read the raw video frame RVF from the frame buffer 202 and generating the output video frame OVF accordingly. Controlled by the timing controller 203, the relationship between the input timing and the output timing needs to meet specific conditions to ensure that the output video frame OVF containing the PIP window is correctly and smoothly presented in real-time. The specific conditions will be explained with reference to FIG. 3.

Figure 3:
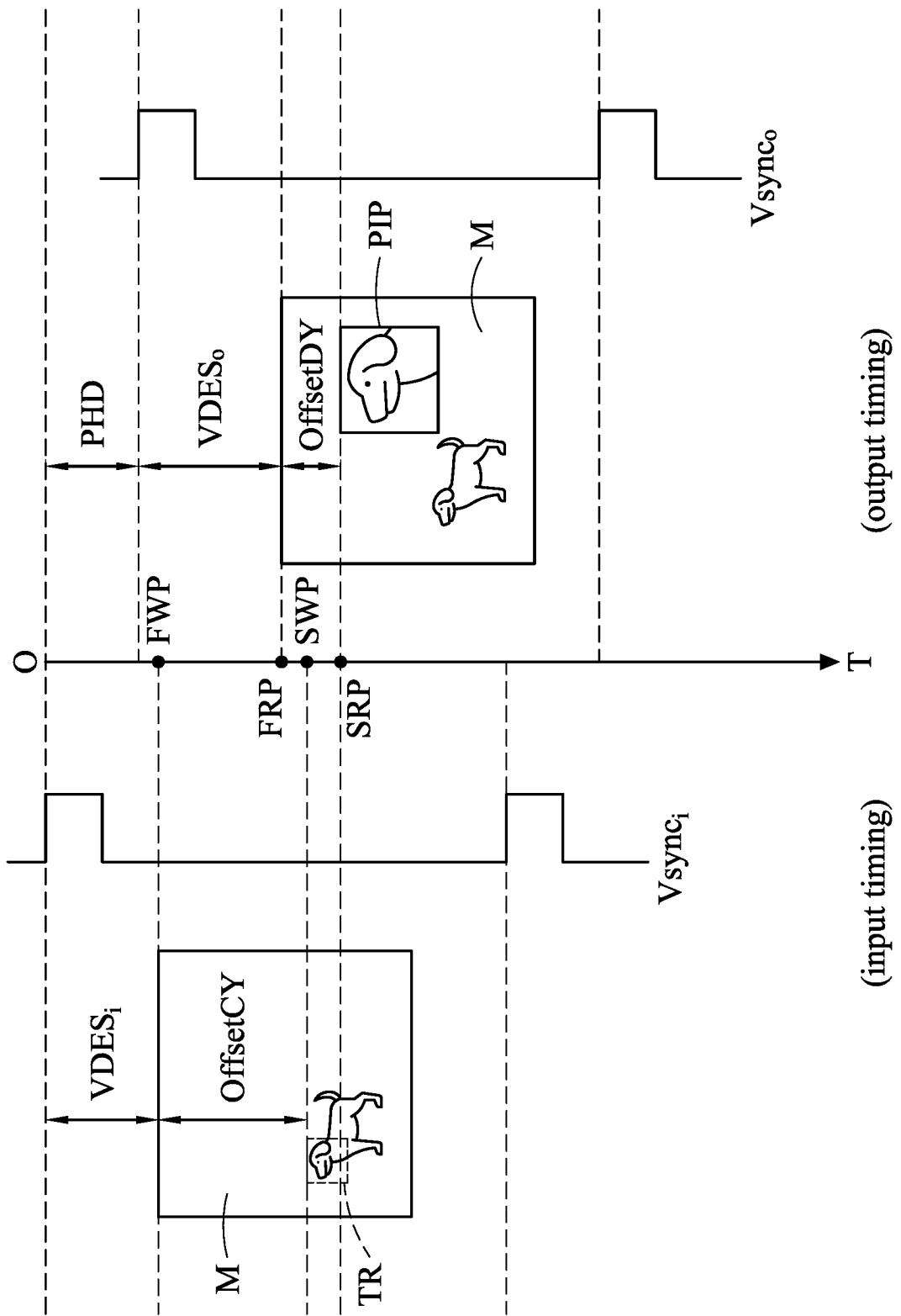
FIG. 3 is a timing diagram illustrating the conditions that need to be met for the input timing and the output timing to ensure the correct and smooth real-time presentation of the output video frame, according to an embodiment of the present disclosure.

FIG. 3 is a timing diagram illustrating the conditions that need to be met for the input timing and the output timing to ensure the correct and smooth real-time presentation of the output video frame OVF, according to an embodiment of the present disclosure. In FIG. 3, the timeline axis T represents a time sequence from top to bottom, where the left side denotes the input timing for the processing unit 201 to write the raw video frame into the frame buffer, and the right side denotes the output timing for the processing unit 201 to read the raw video frame RVF from the frame buffer 202 and generate the output video frame OVF accordingly. The input timing and the output timing are controlled respectively by the first synchronization signal Vsync; and the second synchronization signal Vsync$_o$, both of which are generated by the timing controller 203.

In FIG. 3, the rising edge of the first synchronization signal Vsync; is considered as the reference point, denoted as the origin O on the timeline axis T. The time interval between the rising edge of the first synchronization signal Vsync; and the rising edge of the second synchronization signal Vsync$_o$, representing the phase difference between the input timing and output timing, is denoted as PHD. The time point at which writing the main window into the frame buffer 202 begins is denoted as the first writing point FWP, and the time point at which reading the main window from the frame buffer 202 begins is denoted as the first reading point FRP. Additionally, the difference in number of lines between the target region TR and the main window M of the raw video frame RVF is denoted as OffsetCY. The larger the value of OffsetCY, the closer the target region TR is to the bottom of the main window M. On the other hand, the difference in number of lines between the PIP window and the main window M of the output video frame OVF is denoted as OffsetDY. The larger the value of OffsetDY, the closer the PIP window is to the bottom of the main window M.

In this embodiment, the first writing point FWP must precede the first reading point FRP, because the generation of the output video frame OVF relies on the content of the main window M read from the frame buffer 202. Without reading the content of the main window M, the processing unit 201 cannot generate the output video frame OVF. Measured in terms of written lines, the time difference between the first writing point FWP and the rising edge of the first synchronization signal Vsync$_i$ (i.e., the origin O) is equivalent to VDES$_i$ lines. Similarly, measured in terms of read lines, the time difference between the first reading point FRP and the rising edge of the second synchronization signal Vsync$_o$ is equivalents to VDES$_o$ lines. Since the first writing point FWP must precede the first reading point FRP, the following mathematical relation, denoted as <Formula I>, must hold.

$$PHD + \frac{VDES_o}{(VTT_o \times Vfreq)} > \frac{VDES_i}{(VTT_i \times Vfreq)} \quad \text{<Formula I>}$$

VTT$_o$ denotes the vertical total time of the output timing, which is the time required to generate one output video frame OVF, measured in lines. Vfreq is the frequency of vertical writing and reading, typically measured in Hz. VTT$_i$ denotes the vertical total time of the input timing, which is the time required to write one raw video frame RVF into the frame buffer 202, measured in lines.

Furthermore, the second writing point SWP must precede the second reading point SRP, because the generation of the PIP window relies on the content of the target region TR read from the frame buffer 202. Measured in terms of written lines, the time difference between the second writing point SWP and the rising edge of the first synchronization signal Vsync; is equivalent to VDES$_i$+OffsetCY lines. Similarly, measured in terms of read lines, the time difference between the second reading point SRP and the rising edge of the second synchronization signal Vsync$_o$ is equivalent to VDES$_o$+OffsetDY lines. Accordingly, the following mathematical relation, denoted as <Formula II>, must hold.

$$PHD + \frac{(VDES_o + OffsetDY)}{(VTT_o \times Vfreq)} > \frac{(VDES_i + OffsetCY)}{(VTT_i \times Vfreq)} \quad \text{<Formula II>}$$

To clearly illustrate the conditions that need to be met for the input timing and the output timing, FIG. 3 depicts only the timing of the processing unit 201 handling one frame of the video. However, it should be noted that to ensure the correct and smooth real-time presentation of the output video frame OVF containing the PIP window, the input timing and output timing of each video frame need to meet the above conditions. Relative to <Formula I>, the conditions of <Formula II> are more stringent because VDES$_o$ and VDES$_i$ are essentially fixed values, while OffsetCY and OffsetDY often vary, as the position of the target region TR and PIP window may change with application requirements and scenarios. The following will refer to FIG. 4A and FIG. 4B to explain situations where the conditions of <Formula II> are not met, and known workarounds.

Figure 4A:
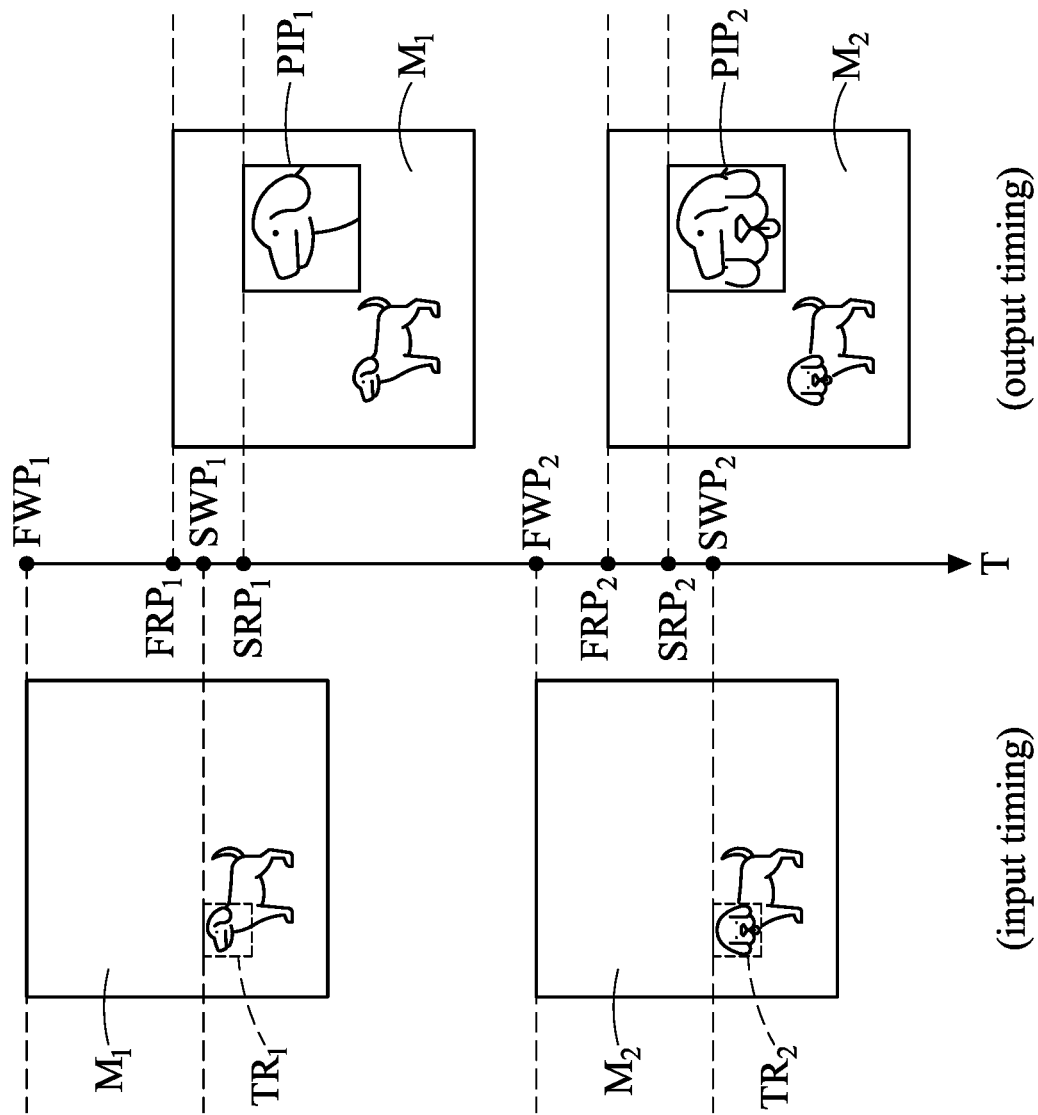
FIG. 4A is a timing diagram illustrating a situation where the second reading point precedes the second writing point, and a first workaround is adopted to handle this situation.

FIG. 4A is a timing diagram illustrating a situation where the second reading point SRP$_2$ precedes the second writing point SWP$_2$, and a first workaround is adopted to handle this situation. As shown in FIG. 4A, the processing unit 201 satisfies the conditions of <Formula I> and <Formula II> for the processing of the first video frame. Specifically, the first writing point FWP$_1$, at which the processing unit 201 starts writing the main window M$_1$ of the first raw video frame into the frame buffer 202, precedes the first reading point FRP$_1$, at which the processing unit 201 starts reading the main window M$_1$ from the frame buffer 202 and generating the first output video frame. Additionally, the second writing point SWP$_1$, at which the processing unit 201 starts writing the target region TR$_1$ into the frame buffer 202, precedes the second reading point SRP$_1$, at which the processing unit 201 starts reading the target region TR$_1$ from the frame buffer 202 and generating the corresponding PIP$_1$ window. However, for the processing of the second video frame, the processing unit 201 only satisfies the conditions of <Formula I> but not <Formula II>. Specifically, the first writing point FRP$_2$, at which the processing unit 201 starts writing the main window M$_2$ of the second raw video frame into the frame buffer 202, precedes the first reading point FRP$_2$, at which the processing unit 201 starts reading the main window M$_2$ from the frame buffer 202 and generating the second output video frame. However, the second writing point SWP$_2$, at which the processing unit 201 starts writing the target region TR$_2$ into the frame buffer 202, occurs after the second reading point SRP$_2$. In this case, the first workaround is to temporarily generate the PIP$_2$ window based on the target region TR$_1$ from the preceding raw video frame read from the frame buffer 202, until the processing unit 201 has written the latter portion of the target region TR$_2$ into the frame buffer. As shown in FIG. 4A, the upper half of the resulting PIP$_2$ window from the first workaround originates from the target region TR$_1$, while the lower half originates from the target region TR$_2$, resulting in a visual discontinuity.

Figure 4B:
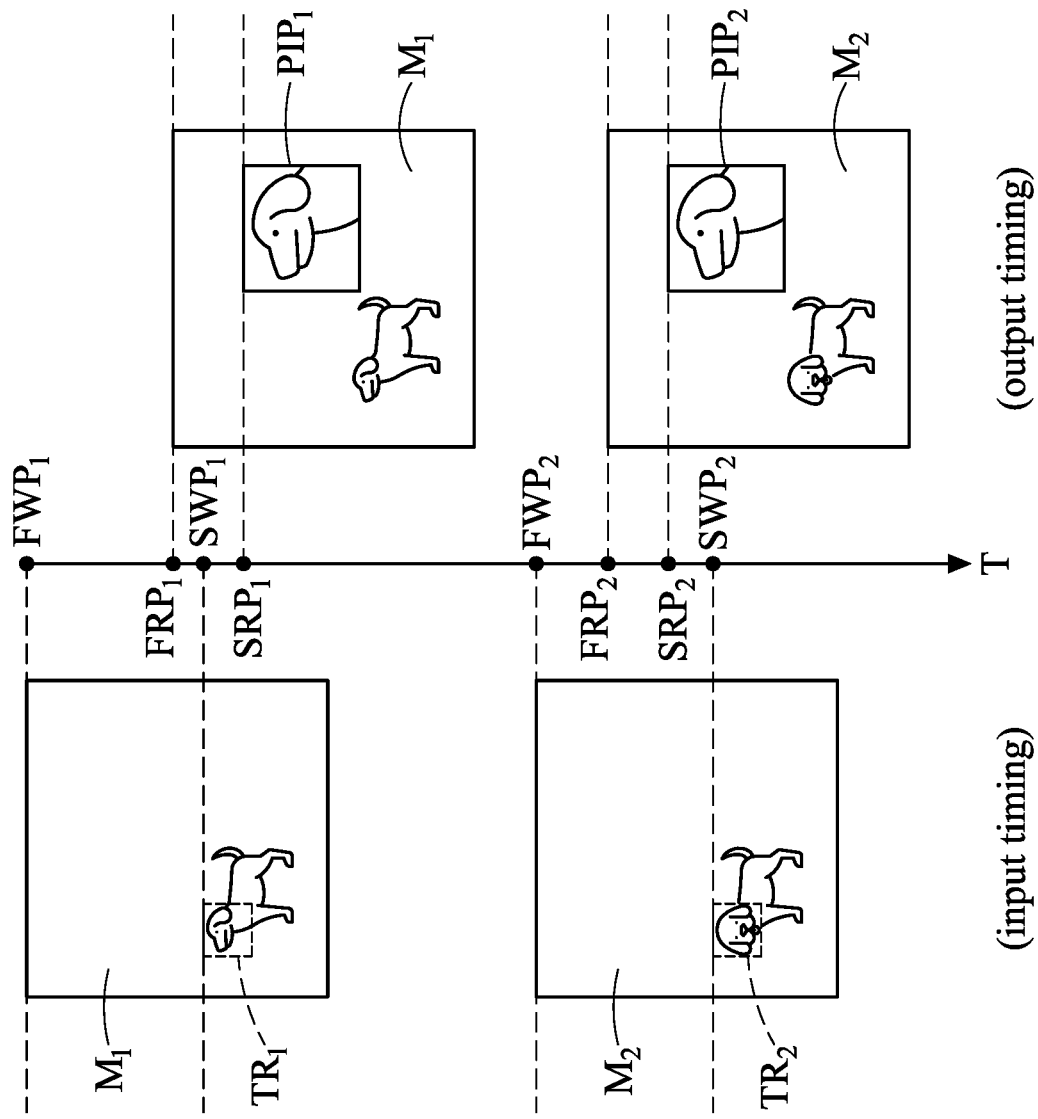
FIG. 4B is a timing diagram illustrating a situation where the second reading point precedes the second writing point, and a second workaround is adopted to handle this situation.

FIG. 4B is a timing diagram illustrating a situation where the second reading point SRP$_2$ precedes the second writing point SWP$_2$, and a second workaround is adopted to handle this situation. Similar to FIG. 4A, the processing unit 201 satisfies the conditions of <Formula I> and <Formula II> for the processing of the first video frame but only satisfies the condition of <Formula I> and fails the condition of <Formula II> for the processing of the second video frame. Unlike the first workaround, the second workaround involves generating the entire PIP$_2$ window based on the entire target region TR$_1$ rather than only portions of the target regions TR$_1$ and TR$_2$. This approach resolves the visual discontinuity caused by the first workaround. However, the display of the PIP$_2$ window relative to the main window M$_2$ will be delayed by one frame (or more). With a refresh rate of 60 Hz, a one-frame delay equates to 16.6 milliseconds, which still impacts the user's visual experience.

The <formula II> is reproduced here for reference.

$$PHD + \frac{(VDES_o + OffsetCY)}{(VTT_o \times Vfreq)} > \frac{(VDES_i + OffsetDY)}{(VTT_i \times Vfreq)} \quad \text{<Formula II>}$$

From <Formula II>, two solutions can be derived to better address the real-time generation and display of the PIP window. One solution is to adjust the value of PHD to satisfy <Formula II>, while the other is to adjust VTT$_i$ to satisfy <Formula II>. The following will refer to FIGS. 5 and 6 to illustrate these two solutions.

Figure 5:
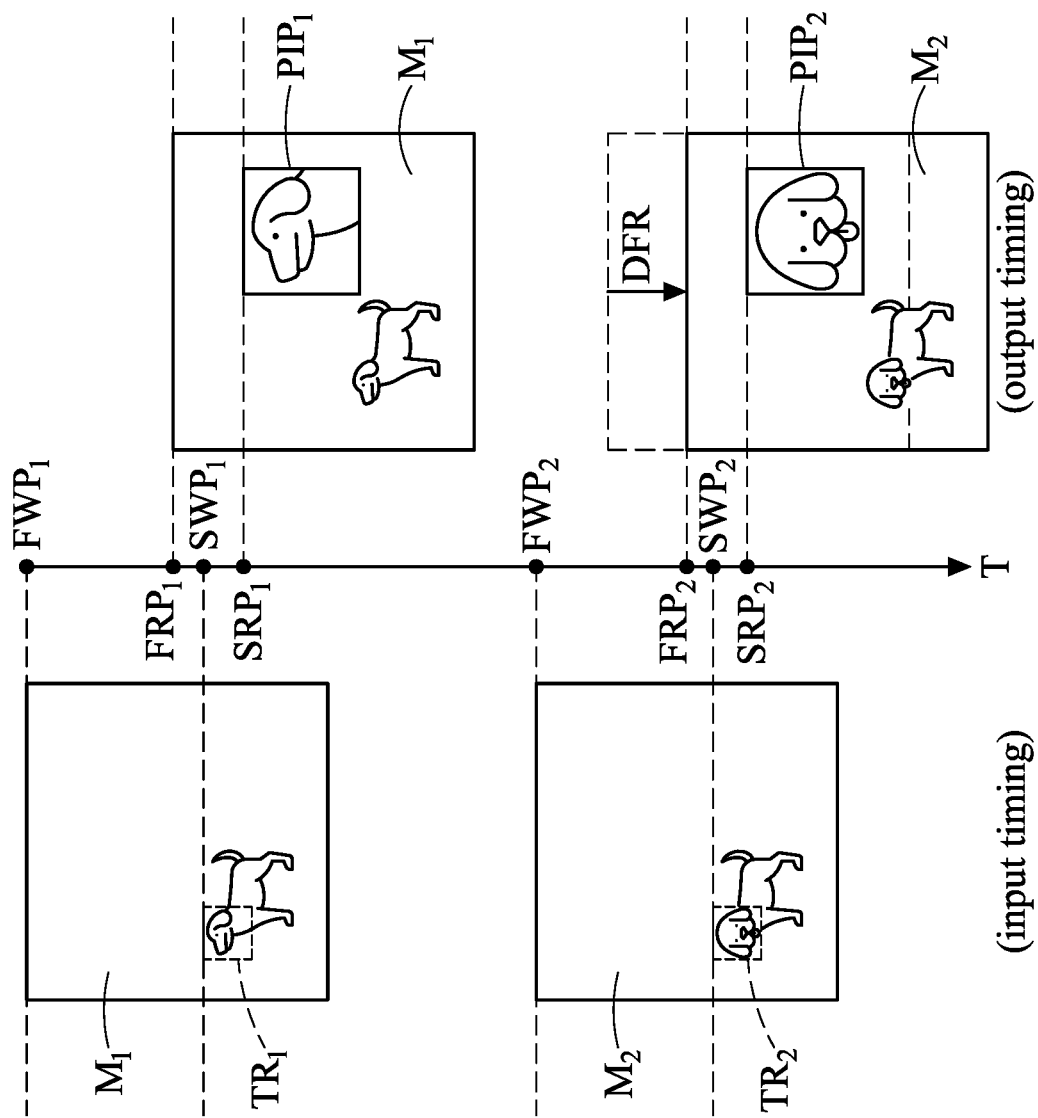
FIG. 5 is a timing diagram illustrating a first solution to generate the PIP window for each video frame in real time, according to an embodiment of the present disclosure.

FIG. 5 is a timing diagram illustrating a first solution to generate the PIP window for each video frame in real time, according to an embodiment of the present disclosure. The first solution is to adjust the value of PHD to satisfy <Formula II>. As shown in the previous FIG. 3, increasing PHD can defer the processing unit 201's reading of the main window, thereby deferring the second reading point SRP as well. Consequently, in FIG. 5, the first reading point FRP$_2$ and the second reading point SRP$_2$ are deferred relative to FIGS. 4A and 4B, as denoted by DFR in the figure. Deferring the second reading point SRP$_2$ until after the second writing point SWP$_2$ occurs satisfies the conditions of <Formula II>.

In an embodiment of the first solution, the timing controller 203 is further configured to detect the phase difference between the input timing and the output timing, and compare the phase difference to a target delay value. Furthermore, the timing controller is configured to increase the vertical frequency Vfreq of the output timing, in response to the phase difference being larger than the target delay value. Otherwise, the timing controller is configured to decrease the vertical frequency Vfreq of the output timing, in response to the phase difference being smaller than the target delay value.

Since <Formula II> can be rewritten as follows:

$$PHD > \frac{(VDES_i + OffsetDY)}{(VTT_i \times Vfreq)} - \frac{(VDES_o + OffsetCY)}{(VTT_o \times Vfreq)}$$

The value of $$\frac{(VDES_i + OffsetDY)}{(VTT_i \times Vfreq)} - \frac{(VDES_o + OffsetCY)}{(VTT_o \times Vfreq)}$$

can be calculated and used to evaluate whether the phase difference meets the condition of <Formula II>. Accordingly, in a further embodiment, said target delay value is determined by the timing controller 203 based on OffsetCY and OffsetDY, which are the difference in number of lines between the target region TR and the main window M of the raw video frame RVF and the difference in number of lines between the PIP window and the main window M of the output video frame OVR, respectively.

In another embodiment of the first solution, the timing controller is further configured to set a reference point of the second vertical synchronization signal Vsync$_o$ to occur at a target phase difference following the corresponding reference point of the first vertical synchronization signal. Similarly, the target phase difference can be determined based on OffsetCY and OffsetDY. For example, the target phase difference can be a value that is slightly larger than the value of value of $$\frac{(VDES_i + OffsetDY)}{(VTT_i \times Vfreq)} - \frac{(VDES_o + OffsetCY)}{(VTT_o \times Vfreq)}.$$

The reference point can be set on the rising edge, the falling edge, the first writing point FWP, or any other significant time point, but the present disclosure is not limited thereto.

Figure 6:
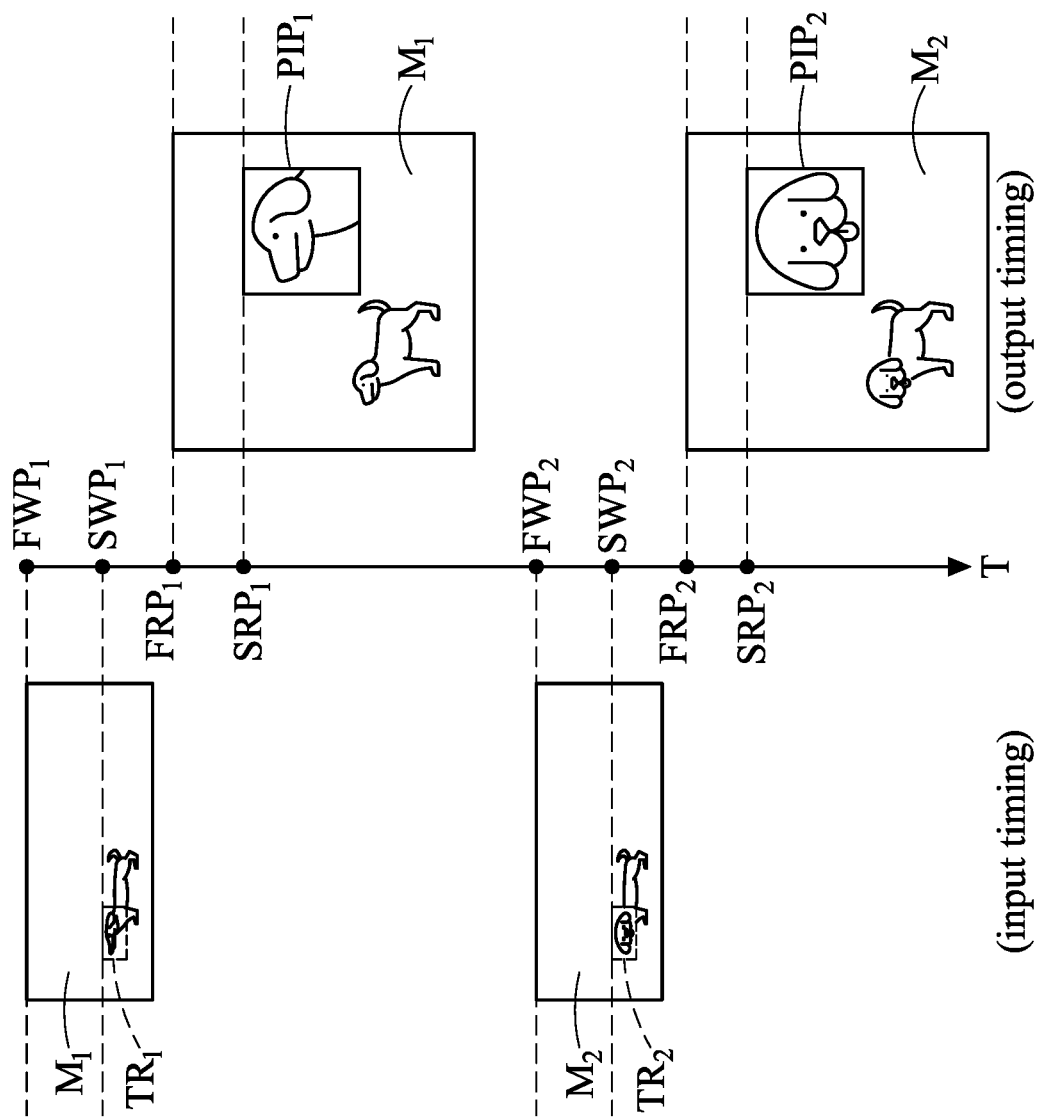
FIG. 6 is a timing diagram illustrating a second solution to generate the PIP window for each video frame in real time, according to an embodiment of the present disclosure.

FIG. 6 is a timing diagram illustrating a second solution to generate the PIP window for each video frame in real time, according to an embodiment of the present disclosure. The second solution is to accelerate the input timing to satisfy <Formula II>. As a result of the acceleration, in FIG. 6, the main windows M$_1$ and M$_2$ are written into the frame buffer 202 by the processing unit 201 in a shorter period. It should be noted that the appearance of the main windows M$_1$ and M$_2$ in FIG. 6 may seem narrower, but this does not indicate a change in the size of the main windows. Rather, it indicates that the main windows M$_1$ and M$_2$ are written into the frame buffer 202 in a shorter period. This ensures that the second writing point SWP precedes the second reading point SRP for each video frame.

In an embodiment of the second solution, the timing controller accelerates the input timing by increasing the vertical total time VTT$_i$ of the input timing. The increase in the vertical total time VTT$_i$ allows for more lines to be written into the frame buffer 202 within a unit of time.

In another embodiment of the second solution, the timing controller 203 is further configured to accelerate the input timing by enabling a Quick Frame Transport (QFT) parameter. The QFT parameter is a feature designed to optimize the transmission of video frames by reducing latency and improving the overall responsiveness of the display system. When enabled, the QFT parameter adjusts various timing parameters to cause more efficient frame writing.

In another embodiment of the second solution, the timing controller 203 is further configured to accelerate the input timing by editing an extended display identification data (EDID) of the display device displaying the output video frame. The EDID are metadata formats for display devices to describe their capabilities to a video source. The EDID data structure involves manufacturer name and serial number, product type, phosphor or filter type (as chromaticity data), timings supported by the display, display size, luminance data and (for digital displays only) pixel mapping data. By adjusting the relevant timing parameters within the EDID, the timing controller 203 ensures that the display device accommodates the necessary timing adjustments for real-time PIP window generation and display.

The graphics system provided by the embodiments of the present disclosure overcomes the technical challenge of instantly generating the PIP window, and ensures smooth and non-stuttering presentation even when changing the position of the target region or the zoom-in scale.

The above paragraphs are described with multiple aspects. Obviously, the teachings of the specification may be performed in multiple ways. Any specific structure or function disclosed in examples is only a representative situation. According to the teachings of the specification, it should be noted by those skilled in the art that any aspect disclosed may be performed individually, or that more than two aspects could be combined and performed.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A graphics system, comprising:
   a frame buffer;
   a timing controller; and
   a processing unit, generating an output video frame based on a raw video frame, wherein the raw video frame comprises a main window, the output video frame comprises the main window and a picture-in-picture window overlaid on the main window, and the picture-in-picture window is generated by zooming in a target region of the main window;
   wherein the processing unit generates the output video frame by:
      writing the raw video frame into the frame buffer sequentially line by line; and
      reading the raw video frame from the frame buffer sequentially line by line, while zooming in a portion of the target region being read to generate a corresponding portion of the picture-in-picture window;
   wherein the timing controller is configured to generate a first vertical synchronization signal to control an input timing for the processing unit to write the raw video frame into the frame buffer, and generate a second vertical synchronization signal to control an output timing for the processing unit to read the raw video frame from the frame buffer and generating the output video frame, such that:
      a first writing point on the input timing precedes a first reading point on the output timing, wherein the processing unit starts writing the main window into the frame buffer at the first writing point, and starts reading the main window from the frame buffer and generating the output video frame at the first reading point; and
      a second writing point on the input timing precedes a second reading point on the output timing, wherein the processing unit starts writing the target region into the frame buffer at the second writing point, and starts reading the target region from the frame buffer and generating the picture-in-picture window at the second point.

2. The graphics system as claimed in claim 1, wherein the timing controller is further configured to control a phase difference between the input timing and the output timing.

3. The graphics system as claimed in claim 2, wherein the timing controller is further configured to detect the phase difference between the input timing and the output timing, and compare the phase difference to a target delay value;
   wherein the timing controller is further configured to increase a vertical frequency of the output timing, in response to the phase difference exceeding the target delay value; and
   wherein the timing controller is further configured to decrease the vertical frequency of the output timing, in response to the phase difference not exceeding the target delay value.

4. The graphics system as claimed in claim 3, wherein the timing controller is further configured to determine the target delay value based on a first line-count difference between the target region and the main window of the raw video frame, as well as a second line-count difference between the picture-in-picture window and the main window of the output video frame.

5. The graphics system as claimed in claim 2, wherein the timing controller is further configured to set a reference point of the second vertical synchronization signal to occur at a target phase difference following the corresponding reference point of the first vertical synchronization signal.

6. The graphics system as claimed in claim 5, wherein the timing controller is further configured to determine the target phase difference based on a first line-count difference between the target region and the main window of the raw video frame, as well as a second line-count difference between the picture-in-picture window and the main window of the output video frame.

7. The graphics system as claimed in claim 1, wherein the timing controller is further configured to accelerate the input timing such that the second writing point precedes the second reading point.

8. The graphics system as claimed in claim 7, wherein the timing controller accelerates the input timing by increasing a vertical total time of the input timing.

9. The graphics system as claimed in claim 7, wherein the timing controller accelerates the input timing by enabling a Quick Frame Transport (QFT) parameter.

10. The graphics system as claimed in claim 7, wherein the timing controller accelerates the input timing by editing an extended display identification data (EDID) of a display device displaying the output video frame.

* * * * *